United States Patent
Hatley et al.

(10) Patent No.: US 6,438,861 B1
(45) Date of Patent: Aug. 27, 2002

(54) ARMATURE SLOT RADIAL CLEARANCE-GAUGING DEVICE

(75) Inventors: Kenneth John Hatley; Richard Michael Hatley, both of Madison; Michael John Bousquet, West Milford, all of NJ (US); Alan Michael Iversen, Clifton Park; William Gene Newman, Scotia, both of NY (US)

(73) Assignee: General Electric Company, Schenectady, NY (US)

(*) Notice: Subject to any disclaimer, the term of this patent is extended or adjusted under 35 U.S.C. 154(b) by 83 days.

(21) Appl. No.: 09/741,893

(22) Filed: Dec. 22, 2000

(51) Int. Cl.[7] .............................. G01B 3/22; G01B 5/14
(52) U.S. Cl. ............................ 33/833; 33/710; 33/542; 33/1 BB; 33/836; 33/655
(58) Field of Search ............................. 33/1 BB, 832, 33/833, 836, 655, 657, 542, 549, 551, 553, 554, 555, DIG. 2, 710, 626

(56) References Cited

U.S. PATENT DOCUMENTS 3,646,686 A * 3/1972 Kreiskorte ................. 33/657
3,817,109 A * 6/1974 Audet et al. ............... 33/832
6,069,473 A   5/2000 Hatley

FOREIGN PATENT DOCUMENTS

| JP | 61-142401 A | * | 6/1986 | ............... 33/832 |
| JP | 0034002 | * | 2/1987 | ............... 33/832 |
| JP | 0051258 | * | 2/1989 | ............ 33/1 BB |
| JP | 40409702 A | * | 1/1992 | ............ 33/1 BB |

* cited by examiner

Primary Examiner—Diego Gutierrez
Assistant Examiner—Lydia M. De Jesús
(74) Attorney, Agent, or Firm—Nixon & Vanderhye P.C.

(57) ABSTRACT

A radial clearance measurement device includes a pair of opposed drive heads, connected by an adjustable strut. Each drive head is fitted with a radial distance measurement device including a plate adapted to slide within a dovetail groove in a radial stator core slot, a spring-loaded plunger adapted to engage a surface of an armature bar located in the radial stator slot, and a linear voltage displacement transducer for measuring distance between the dovetail groove and the armature bar. The device is adapted to move through the bore of the stator, with the plungers engaged with armature bars in diametrically opposed radial stator core slots.

15 Claims, 4 Drawing Sheets

ARMATURE SLOT RADIAL CLEARANCE-GAUGING DEVICE

This invention relates generally to the manufacture of generator stators and, specifically, to a device for measuring the radial distance between a radial stator core slot dovetail and the surface of the top or radially innermost armature bar in the stator core slot.

BACKGROUND OF THE INVENTION

Armature bars are typically installed in radial slots formed in the stator core of the generator. The armature bars are supported by wedges slidably received in dovetail grooves formed in the side walls of the radial core slots.

More specifically, the current procedure for installing an armature slot-support system consists of several steps. One or more filler strips are installed on the surface of the top or radially innermost armature bar to fill the major portion of the radial clearance between the armature bar and the slot dovetail. A corrugated resilient spring is installed on top of the filler. A tapered dovetail wedge is then installed in the slot dovetail above the resilient spring. A second tapered wedge slide having a pre-defined interference fit relative to the dovetail wedge and the slot contents below is positioned for installation. The slide is then forced between the dovetail wedge and the resilient spring until the end of the slide is flush with the end of the wedge. The radial pressure that is developed as the slide is forced in should be sufficient to flatten the spring, seat the dovetail wedge against the slot dovetail, and compress the slot contents against the bottom of the stator core slot. Currently, to obtain the pre-defined interference fit, and, therefore, optimum wedging pressure, each slide is individually gauged by hand to determine the correct thickness, and then individually cut to length outside of the stator core. The process of correctly sizing and cutting each slide by hand is time-consuming, prone to error, and highly dependent on operator conformance to established gauging procedures. An incorrectly gauged slide can result in rework if the interference fit is too great or insufficient radial pressure if the fit is too small. A radially tight armature slot support system is essential for the long-term, reliable prevention of armature bar vibration that can result in premature failure of the armature winding.

BRIEF SUMMARY OF THE INVENTION

This invention provides a device that applies a radial force to the stator core slot contents in two diametrically opposite stator slots, and simultaneously measures the radial distance between the slot dovetail and the surface of the top or radially innermost armature bar automatically and continuously along the entire length of the two slots. The acquired radial clearance information is processed and stored digitally and can be used to fabricate armature slot support parts with auxiliary tools to achieve a consistently tight armature slot support system.

The device, in accordance with the exemplary embodiment, includes a pair of drive heads connected by an expandable strut. The drive heads are engageable with armature bars in diametrically opposed radial stator core slots, and the expandable strut may be adjusted in length, as necessary, by a pneumatic cylinder or other appropriate device.

Each drive head includes a housing that mounts a plurality of axially aligned thrust wheels and a drive pulley. A drive belt extends about the thrust wheels and drive pulley, with the thrust wheels and driving portion of the belt adapted to fit within the stator slot and engage the armature bar surface. The drive pulley is actuated or driven by a motor, e.g., a servo motor, the output shaft of which carries the drive pulley.

Each drive head also includes a pair of distance measuring devices mounted forwardly and rearwardly of the thrust wheels and drive belt. Each measuring device includes a sensor module supporting a plate having tapered ends and adapted to slide within the dovetail grooves in the side walls of the radial stator core slot (also simply referred to as the "slot dovetail." A spring-loaded plunger extends radially from the plate and is adapted to contact the surface of the top armature bar in the stator core slot. As the device is driven through the stator bore, with the drive heads traveling along the opposed radial core slots, the spring-loaded plungers will move radially in and out as the distance between the dovetail grooves and the bar varies. A linear voltage displacement transducer or LVDT associated with each sensor module detects the movement of the respective plunger and thus measures the distance between the slot dovetail and the surface of the armature bar. The data is then transferred to a microprocessor that also controls the axial movement of the device, where it is correlated with information relating to the axial position of the device along the stator bore.

The profile of radial distance from the slot dovetail to the surface of the armature bar versus axial location along the stator core slot is digitally stored for later use with auxiliary tools for fabricating armature slot support parts.

This process is repeated until a radial distancing profile is recorded for each armature core slot in the generator.

Accordingly, in one aspect, the invention relates to an armature slot radial clearance measurement device comprising a pair of opposed drive heads, connected by an expandable strut, each drive head fitted with a radial distance measurement device including a plate adapted to slide within a dovetail in a radial stator slot, spring-loaded plunger adapted to engage a surface of an armature bar located in the radial stator slot, and a transducer for detecting movement between the spring-loaded plunger and the plate.

In another aspect, the invention relates to a radial clearance measurement device comprising a pair of opposed drive heads connected by an adjustable strut, each drive head having supporting means for measuring radial clearance between dovetail grooves in a pair of diametrically opposed radial stator core slots and radially innermost armature bars seated in the stator core slots; and means for driving the device axially along the stator core slots.

DETAILED DESCRIPTION OF THE INVENTION

Figure 1:
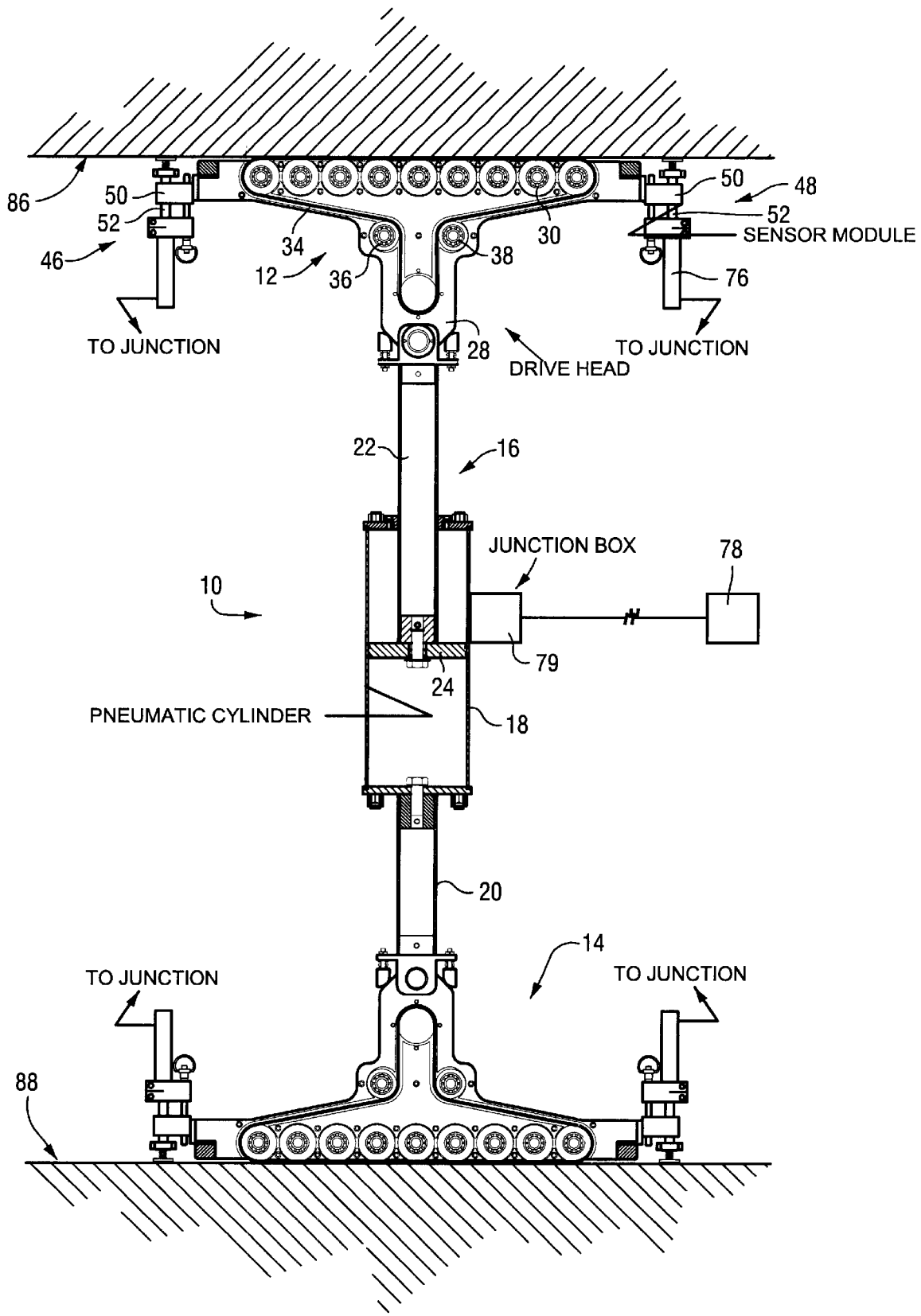
FIG. 1 is a simplified side elevation of a clearance-gauging device according to this invention, located in a stator bore.
Figure 3:
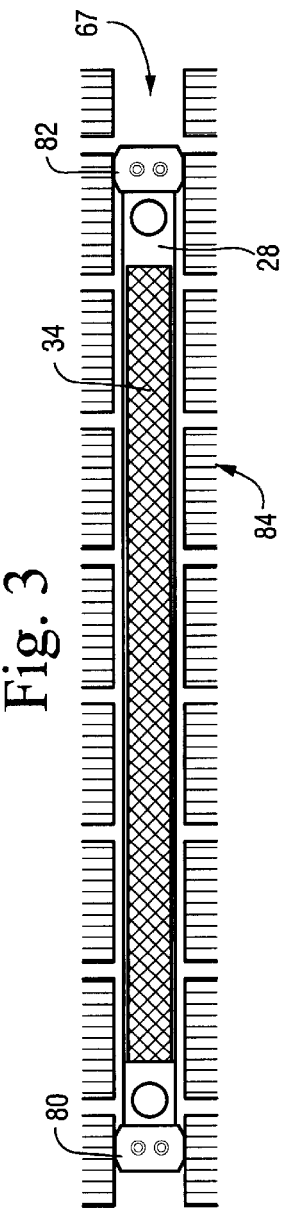
FIG. 3 is a simplified plan of the drive head shown in FIGS. 1 and 2, received in a stator core slot.

With reference to FIG. 1, the device 10 includes a pair of drive heads 12, 14 connected by an expandable strut 16. The strut 16 includes a pneumatic cylinder 18 with a first, fixed rod 20 connected to the cylinder at one end thereof, and a second piston rod 22 that is received in the opposite end of the cylinder, with a piston 24 movable within the cylinder. With this arrangement, the distance between driving heads 12, 14 can be varied to accommodate stator cores of different size, and to facilitate initial set-up and later removal of the device from the stator bore.

Figure 2:
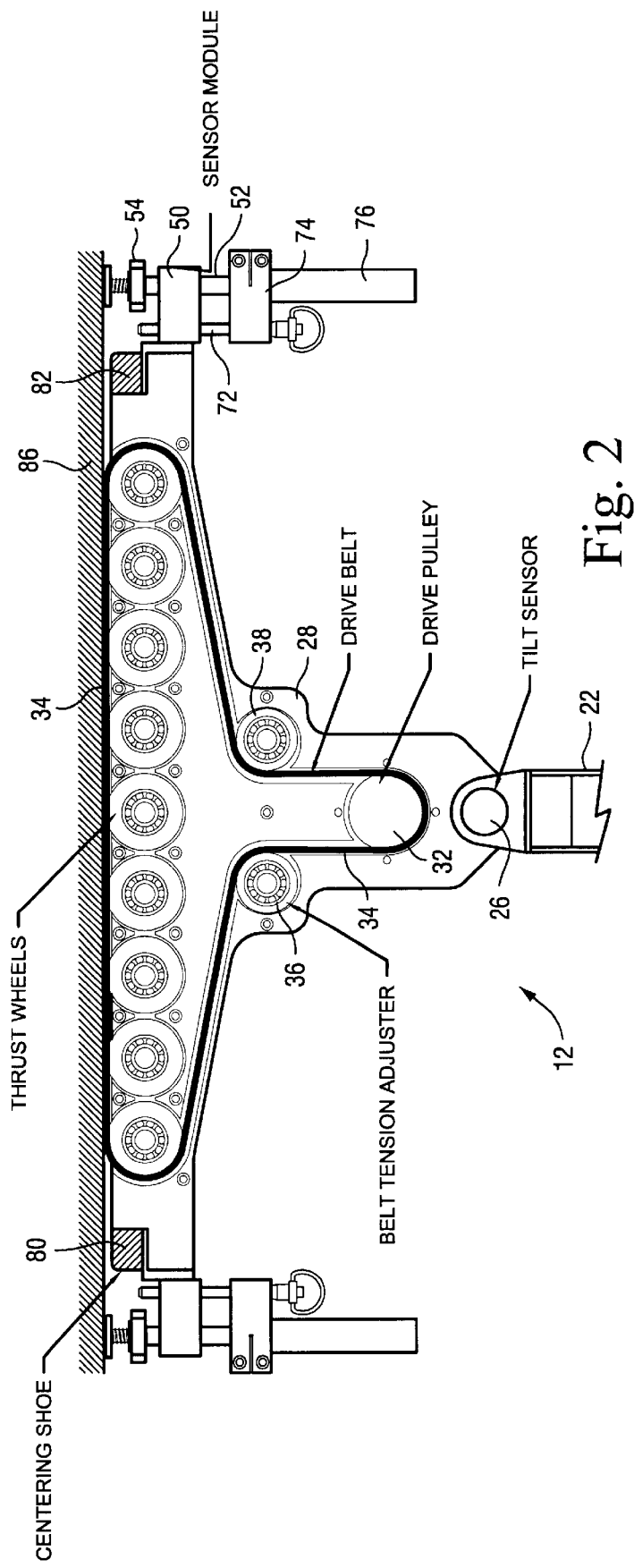
FIG. 2 is an enlarged side elevation of a drive head in the device shown in FIG. 1.
Figure 4:
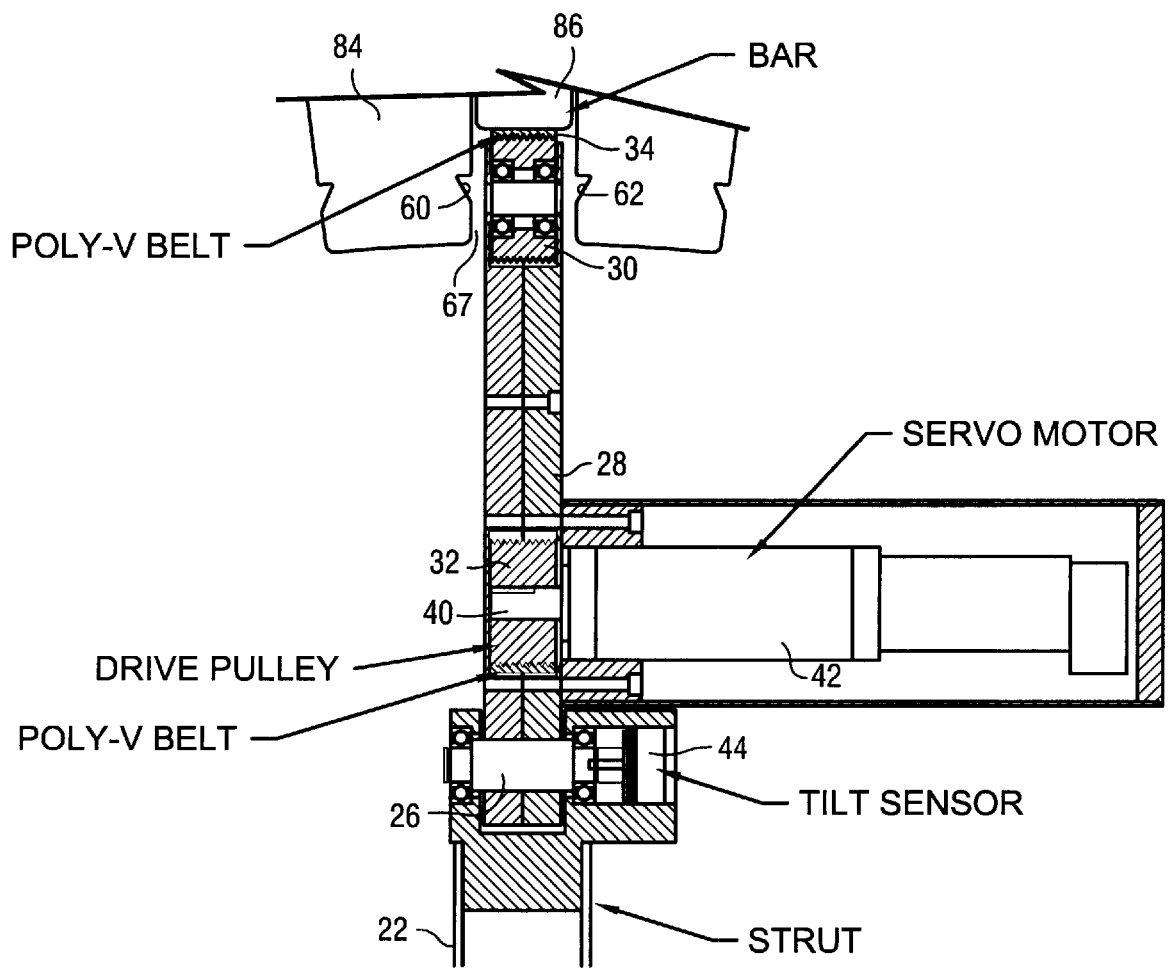
FIG. 4 is a simplified sectional end view of the upper drive head shown in FIG. 1.

Drive heads 12, 14 are identical and, therefore, only one need be described in detail. With reference also to FIG. 2, the drive head 12 is pivotably secured to the piston rod 22 via pin or bolt 26. The drive head includes a housing 28 that mounts a plurality of axially aligned thrust wheels 30, and a drive pulley 32. A drive belt 34 extends about the thrust wheels and the drive pulley, and tension in the drive belt may be adjusted in a conventional fashion via belt tension adjustment wheels 36, 38. The drive pulley 32 is mounted on the output shaft 40 (see FIG. 4) of a servo-motor 42 secured to the housing 28, and extends laterally from the housing, i.e., perpendicular to the strut 16. A tilt sensor 44 is mounted at the remote end of the piston rod 22, and is operatively connected to the pin or bolt 26 to thereby measure any tilting or pivoting movement of the drive head 12 about the pin or bolt 26 for a purpose explained further herein. Note that the drive belt 34, thrust wheels 30 and drive pulley 32 lie substantially within a plane, such that the thrust wheels and a driving portion of the belt are adapted to fit within the stator core slot.

The drive head 12 also includes identical distance measuring devices 46, 48 secured to the housing 28 by any suitable means, forwardly and rearwardly, respectively, of the thrust wheels 30 and in axial alignment therewith. Each measuring device includes a sensor module 50 slidably and adjustably mounted on a rod 52.

Figure 5:
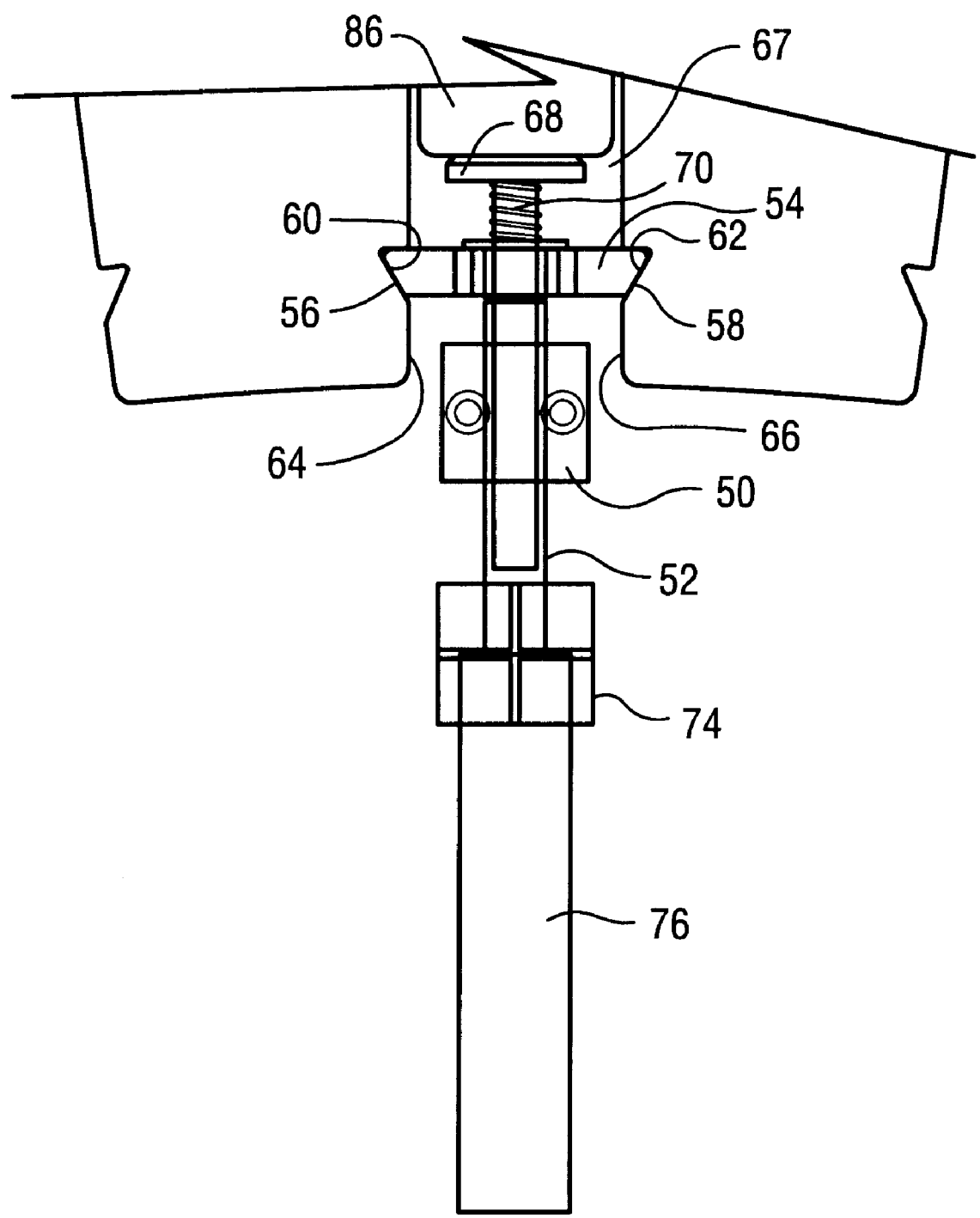
FIG. 5 is an end view of a sensor module shown in FIGS. 1 and 2.

The sensor module mounts a tapered plate 54 in fixed relation thereto. As best seen in FIG. 5, the plate 54 has tapered sides 56, 58 permitting the plate to be received in the slot dovetail grooves 60, 62 in the side walls 64, 66 of the radial stator core slot 67. A plunger 68 extends from the plate 54, with a spring 70 biasing the plunger in an outward direction.

The sensor module 50 and plate 54 are rotatable about the rod 52 to facilitate insertion of the plate 54 in the slot dovetail grooves. Once properly aligned, a locking pin 72 (FIG. 2) is employed to lock the sensor module and plate from further rotation.

The rod 52 extends from a mounting block 74 that, in turn, supports a conventional transducer 76 operatively connected to the plunger 68 via the sensor module 50. The locking pin 72 also extends through the fixed block 74 that precludes any rotation of the sensor module after the pin is inserted through the module 50.

The transducer 76 may be any commercially available type suitable for this application, and is preferably a linear voltage displacement transducer (LVDT). The data from the LVDT's in both drive heads is fed back to the motion control microprocessor 78 (via junction box 79) that controls a drive motor 42 and the actuation of the cylinder 18.

The drive head also mounts a pair of fixed centering shoes 80, 82 located between the measuring devices 46, 48 and the thrust wheels 30, providing a guiding function as the device 10 travels along the core slot 67.

In use, the device is located within the bore of a stator 84 with the expandable strut 16 retracted to facilitate insertion. Air pressure is then applied to the pneumatic cylinder to force the heads 12, 14 against the armature bars 86, 88. The strut 16 is pneumatically expanded to provide approximately 1,600 lb. of radially directed force to the drive heads. In addition, the sensor modules 50 and plates 54 are adjusted as necessary such that plates 54 are seated within the slot dovetail grooves 60, 62. The modules are then locked via pins 72.

The drive motors 42 are then actuated to drive the device 10 along the diametrically opposed armature bars 86, 88, with variations in the distance between the plates 54, representing the core slot dovetails and the armature bars 86, 88 recorded by the four sensor modules 50, and transducers 76. The data is transferred to the motion control microprocessor 78, where it is correlated with the axial position of the sensor modules 50 along the length of the core slot 67. The tilt sensors 44 are employed (along with suitable controls) to maintain desired alignment of the drive motors 42. For example, should one drive head move ahead of the other (causing one or both drive heads to tilt relative to the strut 16, that drive head is slowed to allow the other to catch up.

The profile of radial distances from the slot dovetails to the surface of the armature bars versus axial location within the stator core slot are digitally stored for later use with auxiliary tools for fabricating armature slot support parts.

This process is repeated until a radial distance profile is recorded for each armature core slot in the stator.

The application of this invention thus (1) eliminates the hand-gauging of each individual wedge, (2) reduces the cycle time for armature wedging, (3) prevents rework due to procedure non-conformances, gauging variation, and errors in hand-sizing and cutting each slide to length, and (4) ensures that the armature slot support system assembly is consistently tight.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A radial clearance measurement device comprising:
  a pair of opposed drive heads, connected by an adjustable strut, each drive head fitted with a radial distance measurement device including a plate adapted to slide within a dovetail groove in a radial stator core slot, a springloaded plunger adapted to engage a surface of an armature bar located in the radial stator slot, and a transducer for measuring distance between the dovetail groove and the armature bar.

2. The device of claim 1 and further comprising a microprocessor for receiving data from the transducer and for correlating said data with the position of the device along the length of the stator core slot.

3. The device of claim 1 wherein said adjustable strut comprises a pneumatic cylinder having a first rod fixed to one end of said cylinder and a second rod having a piston at one end thereof slidably received in an opposite end of said cylinder.

4. The device of claim 1 wherein each drive head comprises a plurality of thrust wheels, a drive pulley, and a drive belt extending about said thrust wheels and said drive pulley, said drive belt adapted to engage said surface of said armature bar.

5. The device of claim 4 wherein said radial distance measurement device is located axially forward of said drive belt, and wherein another radial distance measurement device is located axially rearward of said drive belt.

6. The device of claim 4 including means for adjusting tension in said drive belt.

7. The device of claim 4 wherein said drive pulley is driven by a motor.

8. The device of claim 1 wherein said drive heads are pivotably mounted relative to said strut.

9. The device of claim 8 and further comprising means for sensing tilt between said drive heads and said strut.

10. The device of claim 1 wherein said plate has tapered ends adapted to substantially mate with said dovetail groove.

11. A radial clearance measurement device comprising:

a pair of opposed drive heads connected by an adjustable strut, each drive head having supporting means for measuring radial clearance between dovetail grooves in a pair of diametrically opposed radial stator core slots and radially innermost armature bars seated in said stator core slots;

and means for driving said device axially along said stator core slots.

12. The device of claim 11 and further comprising a microprocessor for receiving data from the transducer and for correlating said data with the position of the device along the length of the stator core slot.

13. The device of claim 11 wherein said adjustable strut comprises a pneumatic cylinder having a first rod fixed to one end of said cylinder and a second rod having a piston at one end thereof slidably received in an opposite end of said cylinder.

14. The device of claim 11 wherein said drive heads are pivotably mounted relative to said strut.

15. The device of claim 11 and further comprising means for sensing tilt between said drive heads and said strut.

* * * * *